(12) United States Patent
Wiseman et al.

(10) Patent No.: US 8,639,932 B2
(45) Date of Patent: Jan. 28, 2014

(54) QUANTUM KEY DISTRIBUTION

(75) Inventors: Simon Robert Wiseman, Malvern (GB); Brian Sinclair Lowans, Malvern (GB); Stephen Gerard Ayling, Hanley Caste (GB)

(73) Assignee: Qinetiq Limited, London (GB)

( * ) Notice: Subject to any disclaimer, the term of this patent is extended or adjusted under 35 U.S.C. 154(b) by 17 days.

(21) Appl. No.: 13/125,735

(22) PCT Filed: Oct. 23, 2009

(86) PCT No.: PCT/GB2009/002543
§ 371 (c)(1),
(2), (4) Date: Apr. 22, 2011

(87) PCT Pub. No.: WO2010/049673
PCT Pub. Date: May 6, 2010

(65) Prior Publication Data
US 2011/0213979 A1    Sep. 1, 2011

Related U.S. Application Data

(60) Provisional application No. 61/108,855, filed on Oct. 27, 2008.

(30) Foreign Application Priority Data

Oct. 27, 2008    (GB) .................................. 0819665.1

(51) Int. Cl.
*H04L 9/32* (2006.01)
(52) U.S. Cl.
USPC ....................................................... 713/171

(58) Field of Classification Search
USPC .......................................................... 713/171
See application file for complete search history.

(56) References Cited

U.S. PATENT DOCUMENTS 3,704,996 A    12/1972    Borner et al.
4,291,939 A     9/1981    Giallorenzi et al.
(Continued)

FOREIGN PATENT DOCUMENTS

EP    0 583 115 A1    2/1994
EP    0 610 727 A1    8/1994
(Continued)

OTHER PUBLICATIONS

Benabid, "Hollow-core Photonic Bandgap Fibre: New Light Guidance for New Science and Technology," Philosophical Transactions of the Royal Society, 2006, pp. 3439-3462, vol. 364, Bath, U.K.

(Continued)

*Primary Examiner* — Kambiz Zand
*Assistant Examiner* — Aubrey Wyszynski
(74) *Attorney, Agent, or Firm* — Oliff & Berridge, PLC

(57) ABSTRACT

The invention relates to methods and apparatus for Quantum key distribution. Such methods including authenticating a first node in a communications network with a remote node in the communications network. The authentication may include connecting an authentication device to the first node, agreeing a quantum key between the first node and the remote node based on a quantum signal transmitted or received by the first node and performing an authentication step between the authentication device and the remote node on an encrypted channel. Authentication between the authentication device and remote node may be taken as authentication of the first node.

25 Claims, 2 Drawing Sheets

(56) References Cited

U.S. PATENT DOCUMENTS

Figure 1:
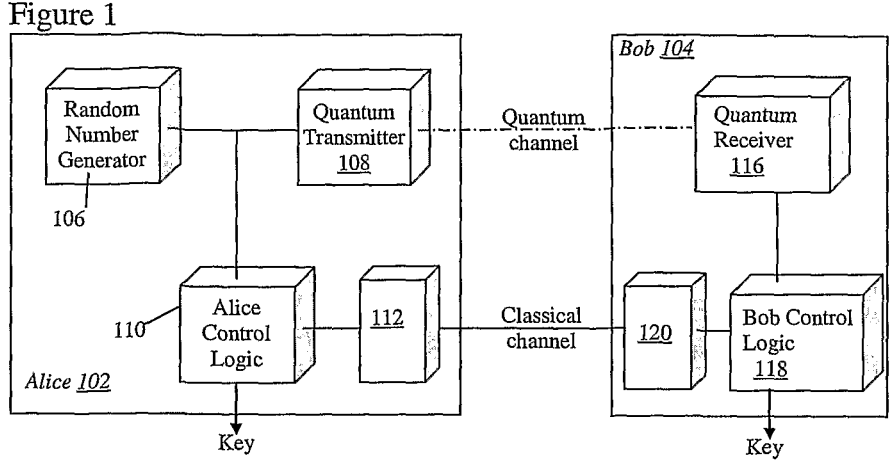

| | | | |
|---|---|---|---|
| 4,691,984 A | 9/1987 | Thaniyavarn |
| 4,775,971 A | 10/1988 | Bergmann |
| 4,807,952 A | 2/1989 | Jaeger et al. |
| 5,150,436 A | 9/1992 | Jaeger et al. |
| 5,157,754 A | 10/1992 | Bierlein et al. |
| 5,166,991 A | 11/1992 | Jaeger et al. |
| 5,410,625 A | 4/1995 | Jenkins et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A | 2/2000 | Rarity et al. |
| 6,145,079 A | 11/2000 | Mitty et al. |
| 6,240,514 B1 | 5/2001 | Inoue et al. |
| 6,717,708 B2 | 4/2004 | Prosyk |
| 6,798,795 B2 | 9/2004 | Yoo |
| 6,806,986 B2 | 10/2004 | Asobe et al. |
| 7,068,790 B1 | 6/2006 | Elliott |
| 7,155,078 B2 | 12/2006 | Welch et al. |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 | 9/2009 | Han et al. |
| 7,627,126 B1 | 12/2009 | Pikalo et al. |
| 7,646,873 B2 | 1/2010 | Lee et al. |
| 7,706,535 B1 | 4/2010 | Pearson et al. |
| 7,760,883 B2 | 7/2010 | Kuang |
| 7,864,958 B2 | 1/2011 | Harrison et al. |
| 7,865,048 B2 | 1/2011 | McCaughan et al. |
| 8,488,790 B2 | 7/2013 | Wellbrock et al. |
| 2002/0025046 A1 | 2/2002 | Lin |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0032954 A1 | 2/2004 | Bonfrate et al. |
| 2004/0034776 A1 | 2/2004 | Fernando et al. |
| 2004/0109564 A1 | 6/2004 | Cerf et al. |
| 2004/0184603 A1 | 9/2004 | Pearson et al. |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0135620 A1 | 6/2005 | Kastella et al. |
| 2005/0190921 A1 | 9/2005 | Schlafer et al. |
| 2005/0249352 A1 | 11/2005 | Choi et al. |
| 2005/0259825 A1 | 11/2005 | Trifonov |
| 2005/0286723 A1 | 12/2005 | Vig et al. |
| 2006/0002563 A1 | 1/2006 | Bussieres et al. |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0290941 A1 | 12/2006 | Kesler et al. |
| 2007/0014415 A1 | 1/2007 | Harrison et al. |
| 2007/0016534 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1 | 7/2007 | Blom et al. |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 | 1/2008 | Tajima et al. |
| 2008/0031456 A1 | 2/2008 | Harrison et al. |
| 2008/0137858 A1 | 6/2008 | Gelfond et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 | 12/2008 | Stepanov et al. |
| 2009/0016736 A1 | 1/2009 | Beal et al. |
| 2009/0074192 A1 | 3/2009 | Beal et al. |
| 2009/0106551 A1 | 4/2009 | Boren et al. |
| 2009/0175452 A1* | 7/2009 | Gelfond et al. ............ 380/277 |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0290626 A1 | 11/2010 | Jenkins et al. |
| 2010/0293380 A1 | 11/2010 | Wiseman et al. |
| 2010/0299526 A1 | 11/2010 | Wiseman et al. |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 1 605 287 A2 | 12/2005 |
| EP | 1 633 076 A1 | 3/2006 |
| EP | 1 643 663 A1 | 4/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 | 9/2005 |
| JP | A-2007-500370 | 1/2007 |
| JP | A-2007-053591 | 3/2007 |
| JP | A-2007-129562 | 5/2007 |
| WO | WO 92/11550 | 7/1992 |
| WO | WO 92/11551 A1 | 7/1992 |
| WO | WO 92/11554 A2 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007-105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |

(56) References Cited

FOREIGN PATENT DOCUMENTS

| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates For Practical Quantum Cryptography," Helsinki Institute of Physics, Feb. 1, 2008, pp. 1-26, Helsinki, Finland.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/496,324 in the name of Ayling, filed Mar. 15, 2012.
U.S. Appl. No. 12/863,483 in the name of Wiseman, filed Jul. 19, 2010.
U.S. Appl. No. 12/863,509 in the name of Jenkins, filed Jul. 19, 2010.
U.S. Appl. No. 12/992,695 in the name of Wiseman, filed Nov. 24, 2010.
Office Action dated May 11, 2012 issued in U.S. Appl. No. 12/812,849.
Stucki et al., "Quantum Key Distribution Over 67km With Plug &Play System," New Journal of Physics 4, pp. 41.1-41.8, 2002.
Oct. 29, 2012 Office Action issued in U.S. Appl. No. 12/993,146.
Nov. 8, 2012 Office Action issued in U.S. Appl. No. 12/863,510.
Nov. 9, 2012 Office Action issued in U.S. Appl. No. 13/130,790.
Rass, S., "A Method of Authentication for Quantum Networks", PWASET, vol. 12, Mar. 2006; ISSN 1307-6884, pp. 149-154.
Bechmann-Pasquinucci et al., "Quantum key distribution with trusted quantum relay", May 12, 2005, p. 1-13, University of Pavia; UCCI.IT.XP 002534289.
Bennett et al., "Quantum Cryptography: Public Key Distribution and Coin Tossing", International Conference on Computers, Systems & Signal Processing, Dec. 10-12, 1984, pp. 1-5, Bangalore, India.
Duligall et al., "Low cost and compact quantum key distribution", New Journal of Physics, Institute of Physics Publishing, Bristol, GB. vol. 8, No. 10, Oct. 2006, pp. 1-16, 2006, XP 020107565.
Elliott et al., "Building the quantum network", New Journal of Physics, Institute of Physics Publishing, Bristol, GB, vol. 4, Jul. 12, 2002, pp. 46.1-46.12, XP 002271991.
Fernandez et al., "Gigahertz Clocked Quantum Key Distribution in Passive Optical Networks", leos Summer Topical Meetings, 2006 Digest of the Quebec City, Canada, Jul. 17, 2006, pp. 36-37, XP 010940123.
Fernandez et al., "Passive Optical Network Approach to Gigahertz-Clocked Multiuser Quantum Key Distribution", Journal of Quantum Electronics, vol. 43, No. 2, pp. 130-138, Feb. 2007.
Brassard et al., "Multi-User Quantum Key Distribution Using Wavelength Division Multiplexing", Université de Montréal, École, Polytechnique de Montréal, pp. 1-5, XP 002534322.
Gordeev et al., "Tunable electro-optic polarization modulator for quantum key distribution applicators", Optics Communications, vol. 234, pp. 203-210, Feb. 13, 2004.
Horikiri et al., "Quantum key distribution with a heralded single photon source", International Quantum Electronics Conference, 2005, pp. 1617-1618, Jul. 11, 2005.
Lee et al., "Quantum Authentication and Quantum Key Distribution Protocol", Korea University, Jan. 11, 2006, pp. 1-8, XP002534292.
Rao et al., "Nonlinear frequency conversion in semiconductor optical waveguides using birefringent, modal and quais-phase-matching techniques", Journal of Optics A: Pure and Applied Optics, vol. 6, pp. 569-584, 2004.
Ljunggren et al., "Authority-based user authentication in quantum key distribution", Physical Review A, vol. 62, pp. 022305-1-022305-7, Jul. 13, 2000, XP 002534291.
Kuhn, "A Quantum Cryptographic Protocal with Detection of Compromised Server", Quantum Information and Computation, vol. 5, No. 7, 2005, pp. 551-560, XP 002520284.
Kumavor et al., "Comparison of Four Multi-User Quantum Key Distribution Schemes Over Passive Optical Networks", Journal of Lightwave Technology, vol. 23, No. 1, pp. 268-276, Jan. 2005, XP 001227328.
Malis et al., "Improvement of second-harmonic generation in quantum-cascade lasers with true phase matching", Applied Physics Letters, vol. 84, No. 15, pp. 2721-2723, Apr. 12, 2004, XP 12061044.
Masanovic et al., "Design and Performance of a Monolithically Integrated Widely Tunable All-Optical Wavelength Converter with Independent Phase Control", IEEE Photonics Technology Letters, vol. 16, No. 10, pp. 2299-2301, Oct. 2004.
Menezes et al., "Handbook of Applied Cryptography", Chapter 13 Key Management Techniques, CRC Press LLC, 1997, pp. 547-553, XP 002520285.
Nambu et al., "BB84 Quantum Key Distribution System based on Silica-Based Planar Lightwave Circuits", Apr. 22, 2008, pp. 1-11.
Hwang et al., "Provably Secure Three-Party Authenticated Quantum Key Distribution Protocols", IEEE Transactions on Dependable and Secure Computing, vol. 4, No. 1, pp. 71-80, Jan.-Mar. 2007, XP 11165308.
Mo et al., "Quantum key distribution network with wavelength addressing", University of Science and Technology of China, Oct. 15, 2006, pp. 1-11, XP 002534290.
Nguyen et al., "802.11i Encryption Key Distribution Using Quantum Cryptography", Journal of Networks, vol. 1, No. 5, pp. 9-20, Sep./Oct. 2006, XP 002576733.
Moutzouris et al., "Second Harmonic Generation in GaAs/AlGaAs Waveguides with Femtosecond Pulses Near 1.55 μm Using Modal Phase Matching Technique", Lasers and Electro-Optics Europe, Conference Munich, Germany, Jun. 22-27, 2003, XP 010710252.
Jäger et al., "Modal dispersion phase matching over 7 mm length in overdamped polymeric channel waveguides", Applied Physics Letters, vol. 69, No. 27, pp. 4139-4141, Dec. 30, 1996, XP 12016922.
Yin et al., "Inegrated ARROW waveguides with hollow cores," Optics Express, Optical Society of America, Washington, DC, USA, vol. 12, No. 12, pp. 2710-2715, Jun. 14, 2004, XP 002363659.
Yariv, "Coupled-Mode Theory for Guided-Wave Optics", IEEE Journal of Quantum Electronics, vol. QE9, No. 9, pp. 919-933, Sep. 1973.
Rahmatian et al., "An Ultrahigh-Speed AlGaAs-GaAs Polarization Converter Using Slow Wave Coplanar Electrodes", IEEE Photonics Technology Letters, vol. 10, No. 5, pp. 675-677, May 1998, XP 11046059.
Finlayson et al., "Polarization Conversion in Passive Deep-Etched GaAs/AlGaAs Waveguides", Journal of Lightwave Technology, vol. 24, No. 3, pp. 1425-1432, Mar. 2006, XP 002459136.
Grossard et al., "AlGaAs-GaAs Polarization Converter with Electrooptic Phase Mismatch Control," IEEE Photonics Technology Letters, vol. 13, No. 8, pp. 830-832, Aug. 2001, XP 11047704.
Hall et al., "Optical Guiding and Electro-Optic Modulation in GaAs Epitaxial Layers," Optics Communications, vol. 1, No. 9, pp. 403-405, Apr. 1970.
Haxha et al., "Analysis of polarization conversion in AlGaAs/GaAs electrooptic polarization converter", Optics Communications, vol. 262, pp. 47-56, 2006, XP 002459135.
Heaton et al., "Optimization of Deep-Etched, Single Mode GaAs/AlGaAs Optical Waveguides Using Controlled Leakage Into The Substrate", Journal of Lightwave Technology, vol. 17, No. 2, pp. 267-281, Feb. 1999.
Izuhara et al., "Low-voltage tunable TE/TM converter on ion-sliced lithium niobate thin film", Electronics Letters, vol. 39, No. 15, Jul. 24, 2003, XP 6020699.

(56) References Cited

OTHER PUBLICATIONS

Schlak et al., "Tunable TE/TM-Mode Converter on (001) In-P-Substrate", IEEE Photonic Technology Letters, vol. 3, No. 1, pp. 15-16, Jan. 1991.
Wang et al., "High Speed III-V Electrooptic Waveguide Modulators at $\lambda = 1.3$ μm", Journal of Lightwave Technology, vol. 6, No. 6, pp. 758-771, Jun. 1988.
Kanamori et al., "Three-party Quantum Authenticated Key Distribution with Partially Trusted Third Party," Global Telecommunications Conference, 2008, IEEE Globecom 2008 Proceedings, Piscataway, NJ, USA, Nov. 30, 2008, pp. 1-5. XP 031370037.
Toliver et al., "Demonstration of 1550 nm QKD with ROADM-based DWDM Networking and the Impact of Fiber FWM", 2007 Conference on Lasers, XP 31231032.
Mar. 31, 2009 International Search Report issued in International Application No. PCT/GB2009/000190.
Mar. 31, 2009 Written Opinion of the International Searching Authority in International Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion of the International Searching Authority issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion of the International Searching Authority issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion of the International Searching Authority issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion of the International Searching Authority issued in Application No. PCT/GB2009/001223.
Jul. 14, 2009 International Search Report issued in Application No. PCT/GB2009/001226.
Jul. 14, 2009 Written Opinion of the International Searching Authority issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Aug. 13, 2008 British Search Report issued in Application No. GB0809038.3.
Aug. 13, 2008 British Search Report issued in Application No. GB0809044.1.
Aug. 14, 2008 British Search Report issued in Application No. GB0809045.8.
Jan. 23, 2009 British Search Report issued in Application No. GB0819665.1.
Mar. 19, 2010 International Search Report issued in Application No. PCT/GB2009/002543.
Mar. 19, 2010 Written Opinion of the International Searching Authority issued in Application No. PCT/GB2009/002543.
Mar. 18, 2009 British Search Report issued in Application No. GB0822356.2.
Dec. 21, 2009 International Search Report issued in Application No. PCT/GB2009/002745.
Dec. 21, 2009 Written Opinion of the International Searching Authority issued in Application No. PCT/GB2009/002745.
Mar. 16, 2009 British Search Report issued in Application No. GB0822254.9.
Sep. 23, 2010 International Search Report issued in Application No. PCT/GB2009/002802.
Sep. 23, 2010 Written Opinion of the International Searching Authority issued in Application No. PCT/GB2009/002802.
Mar. 16, 2009 British Search Report issued in Application No. GB0822253.1.
Apr. 7, 2010 International Search Report issued in Application No. PCT/GB2009/002801.
Apr. 7, 2010 Written Opinion of the International Searching Authority issued in Application No. PCT/GB2009/002801.
Jan. 25, 2010 British Search Report issued in Application No. GB0917060.6.
Mar. 21, 2011 International Search Report issued in Application No. PCT/GB2010/001811.
Mar. 21, 2011 Written Opinion of the International Searching Authority issued in Application No. PCT/GB2010/001811.
Jun. 29, 2010 British Search Report issued in Application No. GB0917060.6.
Jun. 1, 2011 International Search Report issued in Application No. PCT/GB2010/001811.
Jun. 1, 2011 Written Opinion issued in Application No. PCT/GB2010/001811.
U.S. Appl. No. 12/993,146 in the name of Hicks et al., filed Nov. 17, 2010.
U.S. Appl. No. 12/993,098 in the name of Wiseman et al., filed Nov. 17, 2010.
U.S. Appl. No. 12/992,695 in the name of Wiseman et al., filed Nov. 15, 2010.
U.S. Appl. No. 13/130,944 in the name of Benton et al., filed May 24, 2011.
U.S. Appl. No. 13/130,897 in the name of Wiseman et al., filed May 24, 2011.
U.S. Appl. No. 13/130,790 in the name of Wiseman et al., filed May 24, 2011.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Nov. 16, 2012 Office Action issued in U.S. Appl. No. 13/130,897.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
English Language Version of Apr. 30, 2013 Japanese Office Action issued in Japanese Patent Application No. 2010-543567.
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Nov. 5, 2013 Office Action issued in U.S. Appl. No. 12/863,510.
Lijun Ma, "Experimental Demonstration of an Active Quantum Key Distribution Network with Over Gbps Clock Synchronization," IEEE Communications Letters, vol. 11, No. 12, Dec. 2007, pp. 1019-1021.
Nov. 7, 2013 Office Action issued in U.S. Appl. No. 12/993,098.

* cited by examiner

QUANTUM KEY DISTRIBUTION

This invention relates to methods and apparatus for quantum key distribution, especially to a quantum key distribution apparatus for providing authentication, such as to network nodes in a communication network.

Encryption is commonly used to protect communications over a variety of media, especially communication networks and/or data networks. Encryption is generally based on the parties who wish to protect their communication sharing some secret value. This value may be used to derive a cryptographic key which is used to protect the communication. The more sophisticated the encryption the harder it is to decode without the key—it is generally believed that breaking modern, well administered encryption schemes would require vast conventional computing resources. It is well known however that using the same cryptographic key repeatedly for different communications gives a possible code-breaker more material to work with and potentially introduces vulnerabilities into the encryption. Therefore changing the cryptographic key often is desirable.

Obviously distributing new key material securely is vital as, with knowledge of the key, an eavesdropper can decrypt all communications. Key distribution must also be efficient and convenient however.

New key material may be distributed by encrypting it using the existing key and then distributing as normal data traffic. The new key material can then be used for subsequent communications—including, at some point, another new key. Such a scheme is convenient and allows regular key update but it has a weakness in that if the encryption is broken at any point, i.e. the encryption key is effectively determined, it fails from that point on as an eavesdropper will be able to intercept and decode the message bearing the new key when it is distributed and use that key to intercept future communications.

Quantum key distribution (QKD) is a well known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping. The BB84 protocol as originally described is however potentially vulnerable to a so called man-in-the-middle attack. Here an attacker, usually referred to as Mallory, positions himself so as to be able to intercept and stop all data exchange between Alice and Bob. Mallory then communicates with Alice but pretends to Alice that he is Bob. He also communicates with Bob but in doing so pretends to be Alice. Thus each of Alice and Bob think they are talking to one another but in fact they are actually both talking to Mallory. Were simple QKD protocols used in this scenario Alice would agree a quantum key, i.e. a key derived through QKD, with Mallory (thinking it was Bob). Bob would likewise agree a quantum key with Mallory. Alice, thinking she had agreed a quantum key with Bob would encrypt a message meant for Bob with this key. Mallory could intercept this communication, decrypt it and take any information he wants from the message. To avoid detection he can then re-encrypt this message, this time using the quantum key agreed with Bob, and transmit it onward to Bob. Bob would therefore receive the message which was actually sent by Alice and it would be encrypted using the key he thinks he has agreed with Alice. Bob would therefore not realise anything was wrong. Communications from Bob to Alice would follow the same principle in reverse order.

To overcome the man-in-the-middle attack it is usual for the communicating parties to undertake an authentication step to ensure that Alice is indeed talking to Bob and not to Mallory. Authentication usually involves revealing or using a shared secret, such as an identity key, which is known only to Bob and Alice. Alice, wishing to communicate with Bob, would attempt to contact Bob and set up a quantum key. In doing so she requests authentication based on Bob's identity key. Mallory would not know this and hence could not successfully pretend to be Bob. Similarly Bob, receiving a request to set up a quantum key with someone purporting to be Alice, would request authentication based on Alice's identity key. Authentication does require Alice and Bob to share knowledge of at least one identity key prior to commencing QKD but this key can be supplied once on initialisation of the system. In use the identity key can then be updated using a quantum key derived from an authenticated QKD session.

Authenticated QKD therefore offers secure key distribution. QKD as described however requires an uninterrupted optical path from Alice to Bob to act as a quantum channel. This may be in free space or through an optical waveguide such as a fibre optic cable. In either case distances are limited, not least due to the use of single photons.

One way of overcoming this limitation would be to form a chain of nodes, each node being connected to the next node by an optical link over which QKD can be applied. The use of nodes introduces additional problems of trust and authentication in that each node must be trusted and authenticated for the network to remain secure.

Authentication is also an important requirement of communication networks which rely on conventional cryptography. Nodes wishing to communicate in a standard communications network may also rely on authentication keys to ensure they are communicating with each other and not an impostor—either by direct end-to-end authentication or by relying on a trusted Key Management Centre to authenticate the relevant nodes and supply a session key for use to encrypt traffic between them. Again these authentication keys can be updated in use but when a node, say Endpoint A, is added to the network for the first time an authentication key must be provided to the node for use with another node, say the Key Management Centre (KMC), that it will need to authenticate with. The relevant authentication key must also be provided to the KMC for the authentication to work.

Usually a device known as a fill gun is used for initialising a network node with an authentication key. A fill gun is a secure device that contains a portable store of data which can be used for authentication keys. The fill gun is taken by an operator to the physical location of the relevant nodes in turn, i.e. the KMC and Endpoint A, and used to directly transfer the necessary authentication keys, i.e. the fill gun is a device used by a trusted courier for delivery of the initial authentication keys. The fill gun may be adapted to generate key material itself which is then loaded into the KMC and endpoint A or it may be loaded with keys generated by the KMC and then, when connected to Endpoint A, transfer the appropriate authentication key material.

In either case it is desirable to protect the fill gun so that the keys it carries can not be copied. Also the fill gun must periodically be taken to the KMC to deliver more keys or refill it with new ones. This can involve a significant amount of travel. It should also be noted that network nodes are generally designed to be tamper proof so that if the cryptographic apparatus of a network node is opened or tampered with in any way it will irretrievably delete all the key material it contains. This is an important security feature but it does mean that maintenance of a network node may result in it deleting any key material it has with the result that after the maintenance is completed it needs to be re-initialised.

The present invention relates to an improved method and apparatus for providing network nodes with material that can be used for authentication.

Thus according to the present invention there is provided a method of authenticating a first node in a communications network with a remote node in the communications network comprising the step of connecting an authentication device to the first node, agreeing a quantum key between the first node and the remote node based on a quantum signal transmitted or received by the first node and performing an authentication step between the authentication device and the remote node on an encrypted channel wherein authentication between the authentication device and remote node is taken as authentication of the first node.

The method of the present invention provides a method of allowing a first node in a communication network to agree an authenticated quantum key with a remote node also connected to that network even though the first node and remote node do not posses any shared secret data at the start of the method. The method may thus be used to initialise new nodes added to a network. The first node could be authenticated in turn with each other node in the network, or at least a subset the other nodes, being those with which it may later need to authenticate. Alternatively if keys for communication across the network are handled by one or more control nodes or key management centres (KMCs) the first node may only need to be initialised with the KMCs.

The method of the present invention also provides, in effect, a means for the holder of the authentication device to provide the authentication for the first node to allow it to communicate with the remote node and thus can be seen as a method of user authentication. The authentication device, which is therefore preferably a portable device, for example similar to a conventional fill gun, thus provides the holder of the device with a means of authenticating themselves as being connected to a node in a network—which can be taken as authentication of the node.

The method of the present invention involves the first node and the remote node agreeing a quantum key based on a quantum signal transmitted or received by the first node. The term quantum signal is any signal which may be used as the basis of a quantum key agreement protocol as would be understood by one skilled in the art. For instance the quantum signal may comprise a series of suitably modulated single photons, entangled photons, entangled electrons or the like.

If there is a direct quantum link between the first node and the remote node the first node may transmit or receive the quantum signal directly to or from the remote node. In this case the first node and remote mode exchange a quantum signal and subsequently undertake a quantum key agreement step as in conventional QKD but with the difference that the first node and remote node do not share any authentication data and hence can't authenticate each other directly. The authentication device is however connected to the first node and performs an authentication step with the remote node over an encrypted channel. The remote node thus authenticates that the authentication device is involved and effectively relies on the user of the authentication device to have correctly connected to the first node. Thus the remote node can take the quantum key agreed with the first node as being authenticated. This quantum key can then be used to derive some shared secret data which can be used by the first node and the remote node for authentication in the future.

In general however the first node may not have a direct quantum link with the remote node, i.e. there may be a number of intermediate nodes in any path between the first node and the remote node. Thus the first node and the remote node can not exchange a quantum signal directly. In this case the authentication device may comprise a portable quantum key device and may be adapted to exchange a quantum signal with the first node.

The method may therefore involve establishing a quantum link between an authentication device and the first node. The term quantum link as used herein means any link established between the authentication device and the first node suitable for exchange of a quantum signal. The quantum link could, for example, comprise a free space path and/or a path through any suitable waveguide or waveguides such as fibre optic cable. The skilled person will appreciate that the quantum link should be a direct link between the authentication device and the first node in the sense of having no intermediate node which attempts to detect or replicate the quantum signal. Part of the security of quantum cryptography is the fact that an attempt to measure and/or replicate the quantum signal by anyone other than the intended recipient will lead to detectable errors in the key agreement stages and thus result in failure to agree a key.

The authentication device may therefore comprise at least one of a quantum signal transmitter and a quantum signal receiver for transmitting or receiving a quantum signal on the quantum link established. The first node likewise comprises a quantum signal receiver for receiving a quantum signal from the authentication device and/or a quantum signal transmitter for transmitting a quantum signal to the portable authentication device. Depending on the arrangement of the network an individual node in the network may have only a quantum signal transmitter or a quantum signal receiver. The authentication device may therefore comprise both a quantum signal transmitter and a quantum signal receiver so it can exchange a quantum signal with any node. The method may therefore involve establishing a quantum link between the authentication device and the first node and undertaking a quantum signal exchange between the authentication device and the first node, wherein said quantum signal exchanged between the authentication device and the first node is used in the step of agreeing a quantum key between the first node and the remote node.

The authentication device also establishes a communication link with the remote node. This communication link is a classical communication link, i.e. a link for transmitting and receiving a classical communication signal. The classical communication signal is any signal which may be used in classical communications. For instance it could be an optical signal, a radio frequency signal or any other suitable type of signal. The classical link could comprise a free space path and/or suitable waveguides/conductors. It will be appreciated that the classical communications link can include intermediate nodes as classical communications can be replicated, amplified etc without destroying the signal. Thus the communication link between the authentication device and the remote node may be provided via a number of intermediate nodes. Indeed the authentication device may establish a link with the remote node through the communications network. Note that as used in the current specification the term communication network covers any kind of data transfer network whether used for communications between users and/or computers such as data servers and the like or whether the network is a specialised control network for control of equipment, e.g. a security control network for security sensors and/or access control.

Having established a quantum link between the authentication device and the first remote node a quantum signal is exchanged. The quantum signal may be exchanged according to any suitable protocol for quantum key distribution, for instance the quantum signal may involve transmission of suitably modulated single photon signals such as taught in the BB84 protocol or the B92 protocol. The quantum exchange may involve transmission of a quantum signal from the authentication device to the first node or a transmission of a quantum signal from the first node to the authentication device or both. Whichever device receives the quantum signal attempts to measure the quantum signal in accordance with standard quantum key distribution protocols.

Details regarding the quantum signal exchanged are then used in a quantum key agreement step as is usual in quantum key distribution. However quantum key agreement is performed between the first node and the remote node. Thus the authentication device does not take part in the key agreement step. In order for the remote node to be able to take part in the key agreement step it needs to have available details regarding the quantum signal which was either transmitted or received by the authentication device. Thus the method involves the step of communicating between the authentication device and the remote node regarding the quantum exchange. This communication is carried out over the classical communication link and, to maintain security, the communication is encrypted using a known authenticated cryptographic key. This authenticated communication can thus comprise the authentication step between the authentication device and the remote node. It will be noted therefore that the authentication step will occur prior to the quantum key agreement step and, as will be described below, may be carried out prior to the quantum signal exchange.

The known authenticated cryptographic key may be a cryptographic key which is preloaded into the authentication device or generated in a known way within the authentication device based on preloaded seed material. For instance, the key or suitable seed material may have been loaded into the authentication device at an earlier stage when the authentication device was directed connected to the remote node. Provided that this key is unique, use of this key to encrypt communications sent to the remote node therefore inherently provides the authentication that the authentication device is the originator of such communications. In such an embodiment the key used to encrypt communications between the authentication device and the remote node should be updated periodically to preserve security and this can be achieved by returning the authentication device to the remote node for updating.

Alternatively a cryptographic key could be agreed between the portable authentication device and the remote node as needed. In other words rather than rely on a preloaded key a key could be derived as needed. The skilled person will be aware of various methods to derive keys as necessary, such as the Diffie-Helman method. In this instance the authentication device and remote node will need to mutually authenticate based on known authentication material shared between the authentication device and the remote node. The authentication step may therefore comprise the step of agreeing an authenticated cryptographic key between the authentication device and the remote node using authentication material already known to the authentication device and said remote node. As the authentication material is used only for the purposes of authentication it reduces the amount of traffic based on data which is preloaded into the authentication device and hence reduces the required frequency of update. The step of agreeing an authenticated cryptographic key with the remote node comprises the authentication device sending suitable messages to the communication link and also acting on appropriate messages received.

In one embodiment the step of agreeing an authenticated cryptographic key between the authentication device and the remote node uses quantum key distribution to generate the authenticated cryptographic key as will be described in more detail below. This has the advantage not only of very good security but also that the authentication material is automatically updated during the quantum key agreement step without the need to return the authentication device to the remote node.

Whichever method is used to provide an authenticated cryptographic key, this key is used to encrypt communications between the authentication device and the remote node regarding the quantum signal exchange. Where the authentication device receives the quantum signal the communication may comprise the authentication device sending to the remote node details of the measurements applied to the received quantum signal and what was detected so that the remote node can take part in a quantum key agreement step with the first node as if it had made the measurements itself. Similarly where the authentication device has a quantum signal transmitter the communication may involve the authentication device sending the remote node details of the quantum signal that it transmitted. Alternatively, in the case where the authentication device transmits a quantum signal, the communication could take place before the quantum signal is transmitted and the communication could involve the remote node sending the authentication device material detailing what quantum signal should be sent. In either case the remote node then knows what quantum signal is transmitted to the first node and thus can take part in the key agreement step with the first node.

Once the steps of quantum exchange between the first node and authentication device and communication between the remote node and the authentication device regarding the quantum exchange are completed (in whatever order) both the remote node and the first node have all the information needed to agree a quantum key. They then can agree a quantum key without involving the authentication device further. This key agreement step can be performed according to any standard quantum key distribution protocol and may involve the steps of sifting, error detection and privacy amplification. However given that the first node and remote node do not share any prior shared secret the key agreement step can not include an authentication step. The method relies on the fact that the user of the authentication device identified the first node correctly.

The authentication device has authenticated itself to the remote node in the communication regarding the quantum signal exchange. Thus the remote node knows that it has been communicating to the authentication device and trusts that the user of the authentication device performed the quantum exchange with the correct node, i.e. the first node was the intended node. Therefore the remote node relies on the user of the authentication device to authenticate the first node. Similarly the first node knows that the authentication device has authenticated with the remote node. It is possible however that a malicious user could attempt to hijack the first node by connecting it to their own authentication device and authenticating with a different remote node under the control of the malicious user. In this scenario as far as the first node is concerned it has simply been initialised or reinitialised into a network. Such an attack may be prevented by physical security arrangements, e.g. arrangements regarding access to the first node etc. and use of demountable tokens allowing use of the first node. It will also be detectable by the correct remote node being unable to communicate with the first node.

The first node and the remote node can therefore agree a quantum key without direct authentication between them but have confidence that the key has been agreed with the correct parties. This quantum key can then be used to provide authentication keys for future use. Some or all of the quantum key may be used directly as the authentication key material or a seed for generating such material or the quantum key may be used to encrypt communications between the first node and remote node which include material to be used for authentication. The authentication device may then be removed from the first node and anytime the first node and remote node wish to communicate they can derive a cryptographic key and authenticate each other based on the shared authentication material.

As mentioned the remote node relies on the operator of the authentication device establishing a quantum link with the intended node of the network. This is similar to the conventional fill gun method. To reduce the possibility of mistake the method may include the step of either the authentication device or remote node querying the first node for some credentials. The credentials could simply be whether or not the first node thinks it already has some shared authentication material for the particular remote node. The existence of some authentication data could be indicative that the user has connected to an existing network node and not a new network node. The credentials could comprise some data regarding the characteristics of the first node. For instance if the intended node to be authenticated is a desktop computer and the type of computer, processor, hard drive capacity etc. are known the step of querying the first node for credentials could comprise checking that the characteristics of the first node match those of the intended node and if the result of the query indicated that the first node had the characteristics of a server this would be an indication of a mistake in connection. Alternatively the equipment may have a serial number used for asset tracking and this can be checked as part of the authentication process. The credentials may also comprise some certification data from another source that the remote node trusts.

Given that the remote node trusts the operator to connect the authentication device to the correct node it is preferable that the authentication device is protected from attackers. Physical security in protecting the device is important but preferably the authentication device has additional security measures to prevent use by unauthorised personnel. The method may therefore comprise the step of the user verifying themselves to the authentication device. For instance the device may be arranged to only establish a link with the remote node if a password is entered correctly by the user. Additionally or alternatively the device could be coded to read biometric data of the user and only function when the correct biometric data is available. Any attempt to use the device with an incorrect password or biometric data or attempt to change the password or stored biometric data could result in the destruction of any data stored in the authentication device. Alternatively, the user password or biometric data could be passed over the encrypted link to the remote node which then authenticates it.

As mentioned above the communication link made between the authentication device and the remote node may be encrypted using a cryptographic key derived by quantum key distribution. If there is a direct quantum link between the remote node and the authentication device this may be done by conventional quantum key distribution techniques. However the method may be applied across a communication network and there may a series of quantum links between the authentication device and remote node via one or more intermediate nodes. In this case a series of quantum keys could be agreed, one key for each quantum link. Once the series of quantum keys is complete the remote node could send the authentication device a message (or vice versa) which would be encrypted on over each individual link using the appropriate quantum key, the message containing the end-to-end encryption key to be used for communications between the authentication device and the remote node. This method does however rely on trusting the intermediate nodes.

An improved method for establishing a quantum key over a network is described in our co-pending patent application GB0801406.0 the contents of which are incorporated herein by reference. This co-pending patent application describes a method of quantum key distribution, comprising a quantum exchange step between first and second quantum nodes and a subsequent key agreement step wherein, in the quantum exchange step, a first quantum node and a second quantum node exchange a quantum signal over a quantum link between them and wherein the first quantum node communicates with a first remote node such that the first remote node has information regarding the quantum signal transmitted and/or detected by the first node and the first remote node takes the place of the first quantum node in the subsequent key agreement step.

The method described in GB0801406.0 applies an iterative approach to agreeing a quantum key across a communications network with the advantage that the first remote node is in control of the authentication at each stage. Having established a quantum key to a particular node in the chain, a quantum signal is exchanged between the current node and the next node in the chain. However, instead of the two nodes which exchanged the quantum signal agreeing a quantum key details regarding the quantum exchange are sent to/from the remote node so that it can agree the quantum key directly with the next node in the chain. Once that key has been established the process can be repeated for further nodes. Another co-pending patent application GB0809045.8 describes how this method can be extended to apply quantum key distribution to networks lacking an unbroken chain of quantum links by ensuring that at least one intermediate node is a moveable quantum node which can be connected by a quantum link to a first sub-network at one time and then moved and later connected by a quantum link to a second sub-network to allow quantum key distribution between the two sub-networks where there is no chain of direct quantum links between them.

The methods of GB0801406.0 and/or GB0809045.8 can therefore be used to agree a quantum key between the remote node and the authentication device. The step of agreeing a key between the remote node and the authentication device may therefore comprise the steps of establishing a quantum link between the authentication device and an intermediate quantum node, performing a quantum exchange between the intermediate quantum node and the authentication device, communicating between the intermediate quantum node and the remote note details regarding the quantum signal transmission between the intermediate node and the authentication device, the communication being encrypted using an previously agreed key, and performing a quantum key agreement step between the remote node and the authentication device to agree the authenticated cryptographic key.

The authentication device of the present invention can therefore be effectively be added to the end of the chain of nodes as described in GB0801406.0 and operate as a temporary node in the network. The first node is then a further node in the chain but is not authenticated because the presence of the authentication device is authentication enough.

It will be clear that the method of GB0801406.0 does require the remote node to authenticate with each intermediate node in the chain before the authentication device. Thus each intermediate node must have been previous initialised. Where several nodes require initialisation at the same time the nodes should be initialised in order such that those that appear first in the chain are initialised first.

The idea of the method of GB0801406.0 can also be applied so that an intermediate node exchanges a quantum signal directly with the first node and it is this quantum exchange which is used in agreeing a quantum key with the remote node. In this embodiment the method involves the step of undertaking a quantum signal exchange on a quantum link between the first node and a second node, communicating between the second node and the remote node regarding the quantum signal exchange, said communication being encrypted using a cryptographic key known to the remote node and the second node, and agreeing a quantum key between the first node and the remote node.

In this embodiment of the invention, the first node has a quantum link with a second node, which may be an intermediate network node, and transmits a quantum signal to the second node and/or receives a quantum signal from the second node. The second node communicates with the remote node regarding the quantum signal exchange so that the remote node has all the information necessary to undertake a quantum key agreement step with the first node. As with the embodiment of the invention described above where the authentication device communicates with the remote node, the communication may happen prior to exchange of the quantum signal if the second node is transmitting the signal. In which case the remote node could tell the second node what quantum signal to transmit. Or the communication may occur after the quantum exchange with the second node communicating to the remote node details regarding the quantum signal it transmitted and/or the quantum signal it detected.

In any case the second node and remote node encrypt their communications regarding the quantum signal exchanged using a cryptographic key shared by the remote node and the second node. This cryptographic key could be established by any known means but conveniently may be established by quantum key distribution according to the method of GB0801406.0. This allows the remote node to agree an authenticated cryptographic key with the second node.

After the communication between the remote node and the second node, the remote node has all the information needed to perform a quantum key agreement step with the first node. Any such a key agreement step would be unauthenticated without the presence of the authentication device. The method of the present invention therefore involves connecting the authentication device to the first node and undertaking an authentication step.

In a simple embodiment the authentication device may simply comprise a memory device containing authentication data and the authentication step simply comprises transferring authentication data to the first node to be used by the first node in authenticating the quantum key with the remote node. The encryption is provided by the quantum key being authenticated. In this simple arrangement the authentication device is simply a removable memory device that can be used to provided authentication data to the first node when needed. Again the remote node trusts that the user of the authentication device has correctly connected it to the first node. Once the authentication data has been used by the first node to successfully authenticate with the remote node the agreed key can be used to derive some authentication data for the first node and also some new authentication data for the authentication device.

Clearly it is important in this instance that the authentication device is protected by various physical security arrangements such as described above. Ideally the device would be provided with a series of authentication keys that could be used and would be arranged to output, i.e. use, each authentication key only once.

In this embodiment of the invention the authentication device effectively acts as a token that proves, to the remote node, the identity of the person currently located at the first node. This aspect of the invention is therefore applicable to authentication of users in general.

Where such a simple authentication step is not appropriate the authentication device may instead comprise a quantum signal transmitter and/or receiver. In which case the step of agreeing a quantum key between the first node and the remote node may comprise agreeing an initially unauthenticated quantum key, and the authentication step may comprise undertaking a further quantum signal exchange on a quantum link between the first node and the authentication device, communicating between the first node and the remote node details of the further quantum signal exchanged, said communication being encrypted using the initial unauthenticated quantum key and subsequently performing an authenticated quantum key agreement step between the authentication device and the remote node.

Thus this embodiment of the method essentially involves adding the authentication device as a node in the chain after the first node. The method proceeds by the second node and first node exchanging a quantum signal and the first node agreeing an initial unauthenticated quantum key with the remote node. The remote node then uses this initial unauthenticated key in communications with the first node regarding the quantum signal exchanged with the next node in the chain, i.e. the authentication device. Provided that the authentication device is the next node in the chain and the authentication is successful the remote can rely on the user of the authentication device having connected it correctly to the first node to authenticate the first node. Thus the initial unauthenticated quantum key agreed between the remote node and the first node can be used to derive an identify key to be stored for future use. The authentication device—having also agreed a different authenticated key with the remote node can also updated it identity information.

This embodiment of the invention, where the authentication device is added into a chain after the node to be initialised or authenticated, allows the authentication device to be plugged into the node in question without needing to disturb its links to other nodes. Indeed in the instance where a node to be initialised is located between two nodes which are already known to the remote node it may not be necessary to use a separate authentication device at all. Consider three nodes, nodes A, B and C in a chain with node B in the middle. Suppose all three nodes are known to a remote node which is a key management centre (KMC) but that node B needs some maintenance work performed which result in its identity keys being destroyed by anti tamper devices. Once the work is finished node B needs to be brought back on line. Node A was always operational and so can agree a first quantum key with the KMC. Node A can then undertake a quantum exchange with the next node in the chain, which should be node B, and communicate details of the exchange to the KMC. The KMC then agrees an unauthenticated key with what should be node B and uses this unauthenticated key to receive details about a quantum signal exchanged with the next node in the chain. If the subsequent key agreement step authenticates that the third node is indeed node C the KMC can be confident that the middle node is indeed node B. Clearly this relies on the engineer not having swapped the connections or introduced a fake node but trust of an authorised engineer is not too dissimilar to trust of a user of an authentication device.

The present invention therefore provides a method of initialising a node in a communications network which is suitable for adding new nodes to the network or reintroducing nodes which have been taken off line for maintenance, repair or replacement. In essence the method allows the user of a portable quantum key device to directly connect to a node in the network and thus provide the authentication of that node.

The method also, as mentioned above, provides a general method of user identification for any situation where user identity data is held centrally. The method of user identification may comprise the steps of the user taking a personal authentication device and performing the method as described above, wherein authentication of the first node with the remote node provides identification of the user. The first node may therefore be an apparatus which is adapted for verifying user identity and the remote node has access to user identity data. In other words the first node my be a specialist apparatus designed for user identification. For instance the first node could be a terminal at a border control point for checking personal authentication devices held by people wishing to cross the border. Details of all potential travellers could not be held at each local terminal and may be held in one or more central databases. The method of the present invention allows secure identification and retrieval of the user identity data for the particular user authentication device. The first node may also be an apparatus for providing access for a user to locations, goods or services and the remote node comprises details of authorised users. For instance the first node could be a door access control apparatus for controlling security access to buildings. Only holders of authentication devices which are recognised by a central control apparatus, i.e. the remote node, would be allowed access. Or the first node could be a transaction terminal for allowing a user to authorise a financial transaction. It is therefore reiterated that the term communication network as used in this specification covers any network where there is data transfer and is not limited to network intended for transfer of communications between people. Also the term connecting in relation to connecting the authentication device to the first node does not imply a definite physical connection or indeed a connection that is maintained for the whole of the method process. It simply means that the authentication device can communicate with the first node as required.

The present invention also provides a method of authenticating a first node in a communication network comprising the steps of establishing a quantum link between a portable quantum key device and said first node and also establishing a communications link between said portable quantum key device and a remote node connected to the communication network, undertaking a quantum signal exchange on the quantum link between the portable quantum key device and the first node, communicating between the portable quantum key device and the remote node regarding the quantum signal exchange, said communication being encrypted using an authenticated cryptographic key known to the remote node and the portable quantum key device, and agreeing a quantum key between the first node and the remote node.

Figure 2:
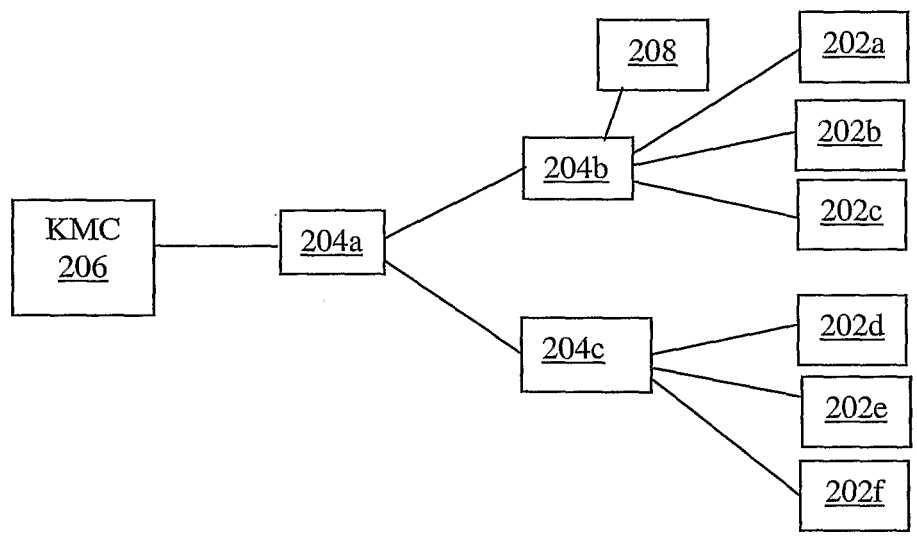
Figure 3A:
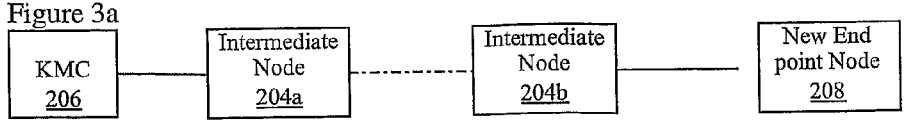
Figure 3B:
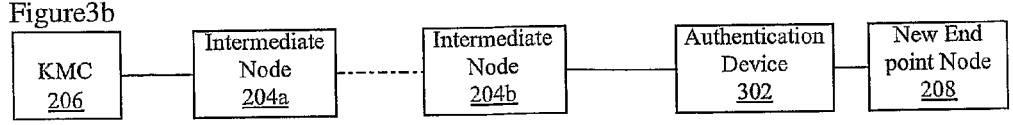
Figure 3C:
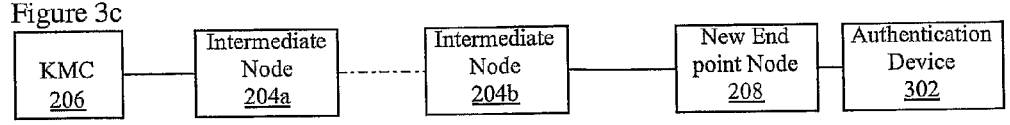
Figure 4:
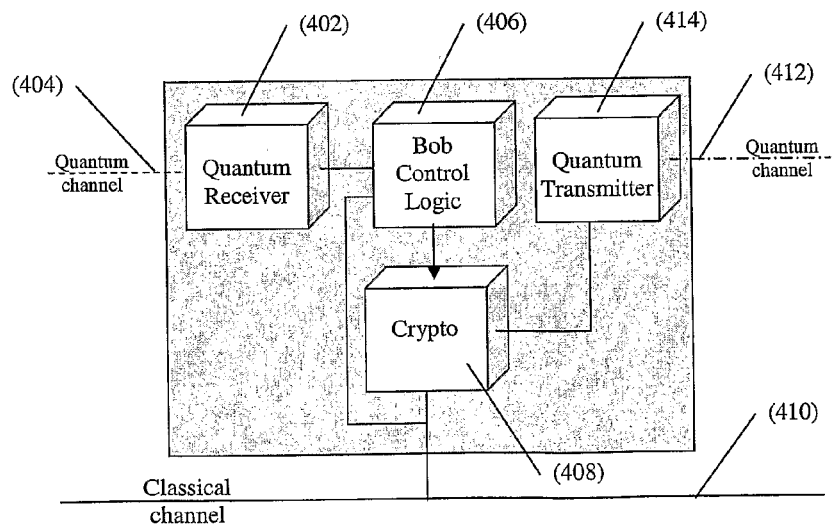

The invention will now be described by way of example only with respect to the following drawings, of which:

FIG. 1 shows a schematic of a standard QKD transmitter (Alice) and receiver (Bob) arranged over a single optical link, FIG. 2 shows a generalised network arrangement, FIG. 3a shows a schematic network comprising a new node, FIG. 3b shows one method of the present invention for initialising the new node, and FIG. 3c shows another method of the present invention, and FIG. 4 illustrates a portable quantum key device.

Referring first to FIG. 2 a generalised communication network is illustrated. In this network a number of endpoints 202a-f are connected to each other via intermediate switching nodes 204. The endpoints may be any apparatus capable of sending and receiving communication signals such as telephones or faxes, personal computers, data servers or databases etc. In this example the endpoints and intermediate switching nodes are connected to one another via fibre optics cable and communicate using standard optical communication protocols although other optical waveguides could be used or one or more of the paths could be free space optics, free space radio or other free space communication or electrical cables or the like.

The switching intermediate nodes may be just switching nodes or may associated with servers or routers or the like, in which case the server or router would have a quantum transmitter or receiver arranged for each optical input/output and a secure means for transmitting data between the quantum transmitters/receivers. The switch nodes may comprise active or passive switches, for instance passive optical switches could be used.

Communication between endpoints relies on the sending endpoint indicating the address of the destination endpoint which is used establish the correct path in an active switched network and also, where a passive optical network switch is used to broadcast the data to several endpoints, to identify the recipient for whom a particular message is meant.

As will be well understood by one skilled in the art to preserve the security of communications across the network endpoints typically apply end-to-end encryption using a cryptographic key known only to the relevant endpoints. Typically the keys, or other data used to derive them, are generated and sent to the endpoints by a Key Management Centre (KMC) 206. Use of a KMC reduces the amount of data that has to be stored by each endpoint and eases the requirements for updating keys.

An endpoint wishing to communicate with another endpoint communicates with the KMC to establish a session key which is sent by the KMC to the appropriate endpoints. Clearly the session key must be kept secret and so the communication between the KMC and each endpoint is encrypted using a key which is unique to that endpoint. Agreeing this key should involve mutual authentication so that the KMC is sure it is communicating with the correct endpoint and the endpoint is certain that it is communicating with the KMC.

To preserve security the key shared between the KMC and a particular endpoint should be changed often. Quantum key distribution (QKD) offers a secure means of deriving new keys as needed.

Referring to FIG. 1 the basic structure of a standard QKD system is shown. The quantum transmitter 102, typically referred to as Alice, is optically linked to the quantum receiver 104, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitable designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-the-middle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties.

Having used QKD to establish a new common shared key value, and mutually authenticated each other, Alice control logic 110 and Bob control logic 118 use that value in part to update the secret identity key and in part as an encryption key for protecting subsequent communication between them.

Referring back to FIG. 2 each node in the network comprises at least one of a quantum transmitter (Alice) or quantum receiver (Bob). For instance the KMC may have an Alice unit arranged to transmit to a Bob in intermediate switch 204a. Switch 204a is also able to exchange a quantum signal with switches 204b and 204c. For instance switch 204a may have one or more Alice units of its own arranged to transmit via the fibre optic links to switches 204b and 204c. Alternatively the Bob unit may be arranged to also receive quantum signals transmitted from Alices in switches 204b and 204c. Whatever the arrangement each link has a quantum transmitter at one end and a receiver at the other. The quantum signal may be mixed with the classical signal using time division or wavelength division multiplexing.

QKD could be performed over each link to agree a link key for each link which could be used to encrypt data transmitted over that link. However co-pending patent application GB0801406.0 teaches an improved method for conducting QKD over a network. In the method of GB081406.0 an iterative approach is taken.

Suppose the KMC wants to agree a key with endpoint 202b. Using the method of GB0801406.0 the KMC, which has an Alice, transmits a quantum signal, such as described above, to a Bob in intermediate switch 204a. The Alice and Bob units of the KMC and switch 204a then agree a first quantum key as described above. Next the switch 204a, which has an Alice, transmits a quantum signal such as described above to a Bob in switch 204b. Switch 204a then sends to the KMC details regarding the quantum signal it transmitted, e.g. the encoding basis and data value for each photon transmitted. This communication is encrypted using the first quantum key and so is secure. The KMC can then agree a quantum key (the second quantum key) with switch 204b directly as if it had transmitted the quantum signal itself. Thus the agreement stage proceeds as normal.

The final stage is that an Alice in switch 204b then transmits an quantum signal to a Bob in endpoint 202b and also transmits a classical communication to the KMC, encrypted using the second quantum key, which gives full details of the quantum signal which was transmitted. The KMC can then undertake a quantum key agreement step directly with the endpoint 202b.

The method described in GB0801406.0 thus offers the ability for the KMC and endpoint to directly agree a quantum key. This quantum key can then be used for delivery of a session key to that endpoint.

As described above authentication is an important part of the quantum key agreement step. The KMC needs to authenticate not only the endpoint so that it is certain it is communicating with the correct endpoint but also the KMC needs to authenticate each intermediate switch to avoid an attacker impersonating a switch. Thus every intermediate switch and endpoint 202a-f must have a unique identity key which it shares with the KMC for authentication.

When a new node, such as new endpoint 208, is added to the network it therefore needs to be provided with an identity key which is shared with the KMC. Conventionally this is done by loading a fill gun at the KMC with an identity key and then physically taking the fill gun to the new node and loading the identity key into the new node. The fill gun may have several different identity keys loaded into it and thus can be used to load several different nodes with identity keys. However periodically it will need to be returned to the KMC for loading with new identity key material.

The present invention uses QKD techniques to provide a means of authentication which, having been loaded once with an identity key, never needs refilling in normal operation.

FIG. 3a illustrates the network path from the KMC 206 to the new endpoint 208 via intermediate switches 204a and 204b. To initialise the new node an authentication device 302, which is a portable quantum key device, is introduced into the network path before the new endpoint 208 as shown in FIG. 3b. The simplest way to achieve this is to simply disconnect the cable from the new endpoint 208 and instead plug it into the portable quantum key device 302. An additional cable then links the portable quantum key device to the new endpoint 208. The portable quantum key device thus has a quantum link to the new endpoint and to switch 204b and classical links to the new endpoint 208 and, via switches 204a and 204b, with the KMC.

The portable quantum key device is, in effect, a portable network node. A suitable device is shown in FIG. 4. The device has a quantum receiver 402 arranged to receive signals on an input quantum channel 404. The quantum receiver connected to some control logic 406. The control logic acts as a Bob in QKD and is capable of undertaking a quantum key agreement step with an Alice via the classical channel 410 and passing the agreed key to a crypto unit 408. The crypto unit 408 is arranged to encrypt and decrypt messages sent on the classical channel 410. Note that the quantum and the classical channels are shown as being separate for illustration purposes but in practice both signals can be transmitted down the same fibre link.

The portable quantum key device also has a quantum transmitter. The quantum transmitter 414 is arranged to transmit a suitable modulated quantum signal on output quantum channel 412 and is also connected to the crypto unit 410.

In use the operator would connect the portable quantum key device 302 into the network as shown in FIG. 3b. The portable quantum key device would send a message to the KMC indicating it was connected into the network.

The first stage of the process would then be for the KMC to agree an authenticated cryptographic key with the portable quantum key device 302. In the preferred embodiment of the invention the KMC agrees a quantum key with the portable quantum key device using the method according to GB0801406.0 as described above. The KMC therefore first performs conventional QKD with intermediate switch 204a to agree a first quantum key. As switch 204a has previously been connected to the network it has a pre-existing identity key shared with the KMC and so the first quantum key is authenticated. Switch 204a then exchanges a quantum signal with switch 204b and also transmits details of the exchange to the KMC using the first quantum key.

The KMC then agrees an authenticated second quantum key with switch 204b. Switch 204b then transmits a quantum signal to the portable quantum key device and, using the second quantum key, transmits details about the quantum exchange to the KMC. The quantum signal is received at the quantum receiver 402 of the portable quantum key device 302. The Bob control logic then undertakes quantum key agreement directly with the KMC.

This key agreement step is authenticated using an identity key known to the portable quantum key device and the KMC. If the key agreement is successful part of the agreed key is used to derive a cryptographic key, a third quantum key, used for message transport and part of it is used to update the identity key held by the portable quantum key device and the KMC. Thus the identity key of the portable quantum key device is automatically updated as part of the normal operation of the device. Hence as long as the device functions correctly there is no need to return it to the KMC for updating.

At this stage the operator of the portable quantum key device enters a password into the device. This is encrypted using the third quantum key and sent to the KMC for verification. This ensures that the portable quantum key device is being used by the correct operator. There may be additional or alternative security measures to ensure that the portable quantum key device is in the correct hands and has not been misappropriated. For instance there may be a biometric reader such as fingerprint or iris scanner or the like. The device may require insertion of a separate smart card to operate correctly. The device is also tamper proof so that if it falls into the wrong hands no useful information can be extracted.

Having authenticated the device and the operator the KMC then commands the portable quantum key device to transmit a quantum signal to the new endpoint 208. The KMC may instruct the portable quantum key device as to what quantum signal to transmit, for instance by sending a string of random numbers to be used as the basis for the encoding basis and data values of the quantum transmission. Alternatively the portable quantum key device may decide what to transmit based, for instance, on the output of a random number generator in the quantum transmitter and then transmit details of the encoding used to the KMC. In either case the transmission between the KMC and the portable quantum key device is encrypted using the third quantum key.

The KMC then undertakes a quantum key agreement step with the new endpoint 208 to agree a fourth quantum key. Importantly this key agreement step is performed without any authentication between the endpoint 208 and the KMC. This fourth quantum key can either be used in whole or in part as the identity key for the new endpoint or it can be used to encrypt communications between the KMC and the endpoint which establish an identity key.

Once the process has been completed the authentication device is disconnected from the network and the new endpoint 208 reconnected with the cable from switch 204b to return to the situation shown in FIG. 3a. The new endpoint 208 can then establish a new quantum key with the KMC as required and can use the existing identity key to authenticate. The identity key for the endpoint will be updated in use as is normal for QKD.

The present invention therefore allows a new or replacement endpoint pr intermediate switch to be introduced into the network as necessary. Also maintenance of an existing node, i.e. endpoint or intermediate switch, may cause the node to delete its identity key for security purposes. Thus nodes may require initialisation after maintenance.

The invention also however effectively allows a user of a portable quantum key device to provide authentication for any node in a network by the presence of the portable quantum key device.

In an alternative arrangement, shown in FIG. 3c, the authentication device 302 is connected to the new end point node 208 without being inserted into the chain of nodes before the new end point node 208. In effect the authentication device 302 is added as a node after the new node 208. The authentication device 302 could again be a portable quantum key device as described above and illustrated in FIG. 4, although the quantum transmitter is not used. In which case such a device would be connected to the new end point node 208 via a quantum link. Once connected the authentication device would send a message to the KMC 206 indicating it was connected into the network.

The KMC would then, if it hadn't already done so, agree an authenticated first cryptographic key with switching intermediate node 204b as described above using the method according to GB0801406.0.

Switch 204b then transmits a quantum signal to the new end point node 208 and, using the first quantum key, transmits details about the quantum exchange to the KMC. The KMC then undertakes a key agreement step with the Bob control logic in the new end point node.

As the new end point node 208 does not share any identity keys with the KMC this key agreement step is unauthenticated. Nevertheless the normal steps of error detection and privacy amplification can be carried out to result in a second, unauthenticated key, which is known only to the KMC 206 and the new end point node 208. The KMC at this stage can not be sure that the key which has just been agreed was agreed with the correct end point node. However for the moment it is prepared to use the key purely for the purposes of agreeing a key with the next node in the chain. The KMC 206 may then send to new end point node 208 in a message encrypted using the second unauthenticated key, a series of random numbers to be used for the transmission of a quantum signal to the next node in the chain, i.e. the portable quantum key authentication device 302. Alternatively as mentioned above the new end point node could generate the quantum signal itself and then send details of what was transmitted to KMC using the second unauthenticated key.

The authentication device 302 receives the quantum signal and the Bob logic 406 then communicates with the KMC to derive a third quantum key. This key is authenticated using an identity key known to the KMC 206 and the authentication device 302. At this stage the operator of the fill gun 302 may have to complete some additional security such as enter a password into the authentication device as described above. Physical and procedural methods will need to be taken to ensure that the user's password is replaced should the new end point prove to be bogus equipment, as it could recover enough information to steal the password.

Assuming the authentication is successful the KMC can rely on the operator to have correctly connected to desired node and thus can safely assume that the node immediately before the authentication device 302 is indeed the target node. Hence the second unauthenticated key agreed with this node can now be taken to be authenticated and used to derive an identity key for the new node 208. Further the third quantum key agreed between the KMC and the authentication device can be used to derive a new identity key for the authentication device.

Once the process has been completed the portable authentication device is disconnected from the network. The new endpoint 208 can then establish a new quantum key with the KMC as required and can use the existing identity key to authenticate. The identity key for the endpoint will be updated in use as is normal for QKD.

As described above the authentication device 302 is a portable quantum key device. The use of a portable quantum key device provides good security as the identity keys held within the device are only ever used in conjunction with cryptographic keys derived by quantum key distribution.

However in some applications the authentication device could comprise a digital memory device which simply supplies an identity key to the node to which it is connected. For instance referring back to FIG. 3c the authentication device 302 could be a memory device which is connected to node 208 to be initialised. The connection could be by making an electrical or optical data connection between the node and the authentication device or in some instances the node could be provided with a specialist reader for reading data from the memory device, e.g. the authentication device could be a smart card which is placed into the reader to make a connection or even swiped through a reader for a temporary connection sufficient to supply the identity data.

Clearly security of such a memory authentication device is important and the device could be provided with a variety of anti-tamper features. Again the authentication device and/or a reader built into the node could require entering of a password/passcode and or biometric check before operating.

This arrangement of the invention basically allows the holder of the authentication device to identify themselves, via the end node 208, to the KMC. The same arrangement could be used for general user authentications. For instance were node 208 a desktop unit it could be arranged to only ever operate when authentication device 302 is connected. In other words the desktop unit may not store any identity keys of its own and would only use the keys stored on and updated to the authentication device. Or the desktop unit could require initialisation when first switched on but then derives and stores its own identity keys as long as it is being continually operated. Once it is powered down however all internal keys may be deleted and re-use would require re-initialisation. In this way the desktop would be secured from attack when not being operated.

Alternatively node 208 may be an access control point and authentication device 302 used to identify the holder to a control system which can decide whether to allow access or not. Or node 208 could be a transaction terminal and authentication device 302 a device for authorising the transaction.

The invention claimed is:

1. A method of authenticating a first node in a communications network with a remote node in the communications network comprising the step of connecting an authentication device to the first node, agreeing a quantum key between the first node and the remote node based on a quantum signal transmitted or received by the first node and performing an authentication step between the authentication device and the remote node on an encrypted channel wherein authentication between the authentication device and remote node is taken as authentication of the first node.

2. A method as claimed in claim 1 comprising the step of establishing a quantum link between the authentication device and said first node and undertaking a quantum signal exchange between the authentication device and the first node, wherein said quantum signal exchanged between the authentication device and the first node is used in the step of agreeing a quantum key between the first node and the remote node.

3. A method as claimed in claim 2 wherein the authentication step comprises communicating between the authentication device and the remote node regarding the quantum signal exchange, said communication being encrypted using a cryptographic key known to the remote node and the authentication device.

4. A method as claimed in claim 3 wherein the authentication step occurs prior to the quantum signal exchange between the authentication device and the first node.

5. A method as claimed in claim 3 wherein the cryptographic key is a cryptographic key which is preloaded into the authentication device or generated in a known way within the authentication device based on preloaded seed material.

6. A method as claimed in claim 3 comprising the step of agreeing an authenticated cryptographic key between the authentication device and the remote node using authentication material already known to the authentication device and said remote node.

7. A method as claimed in claim 6 wherein the step of agreeing an authenticated cryptographic key between the authentication device and the remote node uses quantum key distribution to generate the authenticated cryptographic key.

8. A method as claimed in claim 7 wherein the step of agreeing an authenticated quantum key between the remote node and the authentication device comprise the steps of establishing a quantum link between the authentication device and an intermediate quantum node, performing a quantum exchange between the intermediate quantum node and the authentication device, communicating between the intermediate quantum node and the remote note details regarding the quantum signal transmission between the intermediate node and the authentication device, the communication being encrypted using a previously agreed key, and performing a quantum key agreement step between the remote node and the authentication device to agree the authenticated cryptographic key.

9. A method as claimed in claim 3 wherein the communication between the authentication device and the remote node regarding the quantum signal exchange comprises one of: the authentication device sending to the remote node details of the quantum signal transmitted or received by the authentication device, or the remote node sending the authentication device details of the quantum signal to be transmitted by the authentication device.

10. A method as claimed in claim 1 comprising the step of undertaking a quantum signal exchange on a quantum link between the first node and a second node, communicating between the second node and the remote node regarding the quantum signal exchange, said communication being encrypted using a cryptographic key known to the remote node and the second node, and agreeing a quantum key between the first node and the remote node.

11. A method as claimed in claim 10 wherein the second node is an intermediate node.

12. A method as claimed in claim 10 wherein the communication between the second node and the remote node regarding the quantum signal exchange comprises at least one of (i) the second node sending to the remote node details of the quantum signal transmitted or received by the second node and (ii) sending the second node details of the quantum signal to be transmitted by the second node.

13. A method as claimed in claim 10 wherein the authentication step between the authentication device and the remote node comprises the step of transferring authentication data from the authentication device to the first node to be used by the first node in authenticating the quantum key with the remote node.

14. A method as claimed in claim 10 wherein the step of agreeing a quantum key between the first node and the remote node comprises agreeing an initially unauthenticated quantum key, and the authentication step comprises undertaking a further quantum signal exchange on a quantum link between the first node and the authentication device, communicating between the first node and the remote node details of the further quantum signal exchanged, said communication being encrypted using the initial unauthenticated quantum key and subsequently performing an authenticated quantum key agreement step between the authentication device and the remote node to agree an authenticated cryptographic key.

15. A method according to claim 14 wherein the authentication device is a known node in the network which has a direct quantum link with the first node.

16. A method as claimed in claim 1 wherein the first node is a new node added to a network and/or the remote node is a key management centre.

17. A method as claimed in claim 1 wherein the method is repeated to separately authenticate the first node with a plurality of remote nodes.

18. A method as claimed in claim 6 wherein part of the authenticated cryptographic key is used to replace the authentication material known to the authentication device and said remote node.

19. A method as claimed in claim 1 wherein the quantum key agreed between the first node and the remote node is used (i) directly as the authentication key material or a seed for generating authentication key material or (ii) to encrypt communications between the first node and remote node which include material to be used for authentication.

20. A method as claimed in claim 1 further comprising the step of either the authentication device or remote node querying the first node for some credentials.

21. A method as claimed in claim 1 comprising the step of the user verifying themselves to the authentication device.

22. A method of user identification comprising the steps of the user taking a personal authentication device and performing the method according to claim 1, wherein authentication of the first node with the remote node provides identification of the user.

23. A method as claimed in claim 22 wherein the first node is an apparatus for verifying user identity and the remote node has access to user identity data.

24. A method as claimed in claim 22 wherein the first node is an apparatus for providing access for a user to locations, goods or services and the remote node comprises details of authorised users.

25. A method of authenticating a first node in a communication network comprising the steps of establishing a quantum link between a portable quantum key device and said first node and also establishing a communications link between said portable quantum key device and a remote node connected to the communication network, undertaking a quantum signal exchange on the quantum link between the portable quantum key device and the first node, communicating between the portable quantum key device and the remote node regarding the quantum signal exchange, said communication being encrypted using an authenticated cryptographic key known to the remote node and the portable quantum key device, and agreeing a quantum key between the first node and the remote node.

* * * * *